May 23, 1933.  E. HORNOFF  1,909,962
RADIO GONIOMETER
Filed Jan. 7, 1929
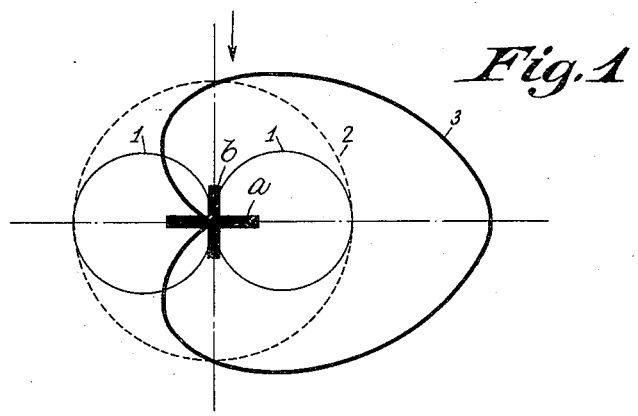
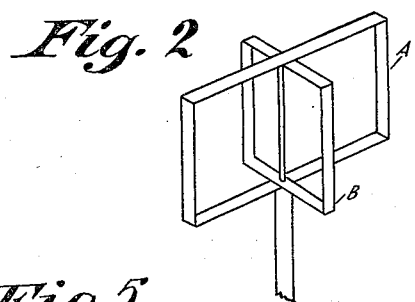
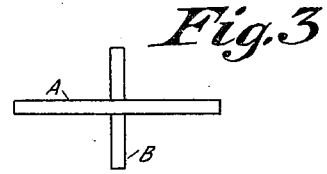
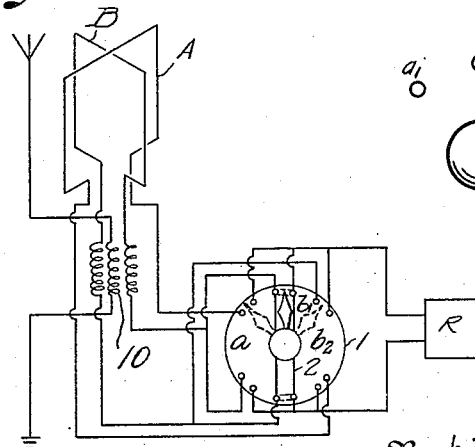
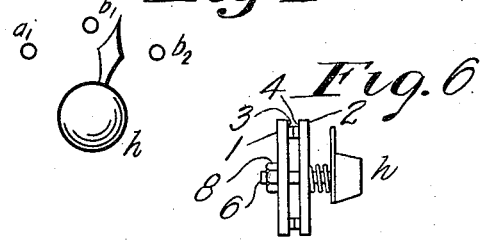
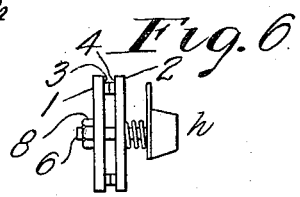
Inventor
ERNST HORNOFF
By his Attorney Patented May 23, 1933

1,909,962

UNITED STATES PATENT OFFICE

ERNST HORNOFF, OF BERLIN, GERMANY, ASSIGNOR TO TELEFUNKEN GESELLSCHAFT FUR DRAHTLOSE TELEGRAPHIE M. B. H., OF BERLIN, GERMANY, A CORPORATION OF GERMANY

RADIO GONIOMETER

Application filed January 7, 1929, Serial No. 330,848, and in Germany February 8, 1928.

In direction finding with a rotatable loop or coil antenna, the line of direction of the waves coming in from the radio beacon is ascertained by placing the coil or loop in the position at which the induced electromotive force is vanishingly small, that is, at right angles to the direction of the signal waves.

To neutralize disturbance caused, for instance, by re-radiation from neighboring linear conductors which tend to obscure the minimum-signal position, energy from a suitable linear auxiliary antenna detuned with reference to the radio beacon waves, is used to compensate said disturbances by suitably coupling said aerial with the direction-finding antenna or the circuit fed thereby.

In order that the sense of direction of the incoming radio beacon waves may be determined (that is, whether they arrive from the front or from the rear), the coil antenna after the line of direction has been found, is turned an angle of 90 degrees, and is connected together with a suitable linear auxiliary antenna, most preferably with the one previously used, though the same must now be made of either equal or opposite phase.

In apparatus of the above type considerable time was lost in rotating the loop through 90 degrees after the position of zero response was heard, to obtain the true pointing direction. Furthermore errors in direction might be caused by rotating the loop to the new position. Especially would this be true if the true pointing position were not obtained at the first position to which the loop is moved.

The object of the present invention is to provide means whereby the sense of direction of the signalling station may be more readily ascertained.

Another object of the present invention is to provide a simple arrangement whereby the sense of direction of the signalling station may be quickly and accurately determined with a minimum number of operations.

A further object of this invention is to provide a device by means of which the true pointing position of the system may be found without rotating the loop aerial from the position of minimum response.

Other objects and advantages of my invention will become apparent from the detailed description which follows and therefrom when read in connection with the attached drawing, in which:

Figure 1 shows characteristic current curves of directional aerial systems;

Figure 2 shows applicant's novel aerial arrangement;

Figure 3 is a plan of Figure 2;

Figure 4 shows a switching arrangement;

Figure 5 shows a circuit arrangement; while, Figure 6 shows the details of switch $h$.

Referring to the drawing, if the two circles 1, Figure 1, represent the polar characteristic of a coil antenna (i. e., the dependence of the induced electromotive forces expressed in terms of radius vectors upon the angle of rotation of a coil antenna), and if circle 2 represents the characteristic of the linear auxiliary antenna, then the assembly comprising the main coil antenna and the linear auxiliary antenna has the characteristic cardioid shaped curve 3 resulting from curves 1 and 2. The positions for minimum and maximum signal strength of the main coil antenna correspond here to the positions $a$ and $b$ of Figure 1 assuming signal is approaching as indicated by the arrow. With the plane of the main coil pointing toward the signal source the effects of the coil antenna and the linear auxiliary antenna become added and result in maximum signal strength, and to the opposite position that is when the coil is rotated through 180° the two effects are subtracted from each other and result in minimum strength of signal. Hence, if the main coil antenna is moved out of its position $a$ Figure 1 where its plane is at right angles to the direction of the waves, through an angle of 90 degrees in one sense or in the other so that it assumes position $b$, and if it is noted which of these two positions $b$ gives maximum or minimum signal strength, it will be possible to thus ascertain the sense of direction of the radio beacon waves.

Now, according to this invention, after placing the main coil antenna A in the position $a$ further rotation of the same can be saved and thereby the determination of the sense of direction of the radio beacon waves can be expedited, if the main coil antenna A is constructionally combined with an auxiliary coil antenna B fixed at right angles to the main loop, as shown, for instance, perspectively in Figure 2 and in plan in Figure 3. If, in this combination, the main coil antenna A, for the object of direction-finding i. e. line of direction, has been placed at right angles to the direction of travel of the signal into position $a$, Figure 1, the coil B will have its plane pointing toward the signal as at $b$ in Figure 1. Now if the switch handle $h$ is alternately changed from position $a1$, Figs. 4 and 5 where the main coil antenna A is connected with the direction-finding receiver, into the positions $b1$ and $b2$, in which instead of the main coil antenna A the auxiliary coil antenna B is associated or connected with the vertical aerial effect and the receiver either in equal phase or opposite phase in relation to the vertical or linear antenna, then since the coil antenna B is in the position $b$, Figure 1, the positions $b1$ and $b2$ of switch $h$, Figs. 4 and 5, correspond either to the sum or the differential effect of the system comprising the auxiliary coil antenna B and the linear auxiliary antenna. By comparing the signal strengths in the $b1$ and the $b2$ positions, the operator may determine at once without rotation of the frames except as described above to get the line of bearing which position corresponds to the integral effect and which position corresponds to the differential effect, and this gives the sense of direction of the radio beacon waves. By convenient and clear marking, one of these positions, say, $b1$ is coordinated to radio beacon waves arriving from the forward direction, and the $b2$ from the rearward direction sense.

As will be seen by an inspection of Figure 5 when the switch $h$ is in the position $a$, the main loop A alone is connected to the receiver the connection being from one side of the loop to a contact 3 on 1 through the metal strip 4 on the switch arm 2 to a second contact 3 on 1, thence to one of the input terminals of the receiver and back through the other arm of switch $h$ to the other side of the main loop. When the switch $h$ is in the position $b1$ the main loop is disconnected from the receiver and the auxiliary loop B is connected through the switch arm and contacts to the receiver as will be apparent by an inspection of Fig. 5. On moving the switch $h$ to position $b2$ the connections between the receiver and loop B are reversed. Open aerial effect is introduced into the system in any manner, as for instance by means of coupling coils 10 when the switch is in positions $b1$ and $b2$.

It is, of course, immaterial whether in the alternate changeover or reversal of switch $h$ into positions marked $b1$ and $b2$ the sense of connection of coil antenna B or that of its coupling coil (provided inductive coupling between the same and the oscillation circuit of the receiver is established) or whether the sense of connection of the coupling coil of the linear auxiliary aerial is reversed.

It is further to be noted that the auxiliary coil antenna B may be given considerably smaller proportions than the main coil antenna A.

I claim:

1. Apparatus for rapid determination of sense of direction in goniometer work, including a receiver, a linear antenna, an auxiliary coil antenna, a main coil antenna constructionally combined with, and displaced by 90 degrees with reference to the auxiliary coil antenna, and a multiple switch operatively interposed between said coil antennæ and said receiver, whereby the auxiliary coil antenna and the main coil antenna may be connected with the receiver alternately and the auxiliary coil antenna may be switched together with the linear antenna both for integrative and differential effect.

2. In direction aerial systems, the combination of a receiver and of a main frame aerial adapted to be connected to said receiver and pointed toward a source of signal energy, an auxiliary frame aerial fixed with respect to said main frame aerial and arranged to be connected to said receiver, means for setting up a vertical aerial effect in said auxiliary frame aerial, and means for connecting either said main frame aerial or said auxiliary frame aerial to said receiver and for reversing the connection between said auxiliary frame aerial and the receiver.

3. In a directional aerial system, the combination of a main frame aerial adapted to be pointed toward a source of signal energy, an auxiliary frame aerial mounted in said main aerial at right angles thereto, and means for alternately connecting said frame aerials to a receiver, means for reversing the connections between said auxiliary frame aerial and said receiver, and means for impressing a vertical aerial effect in said receiver, when connected to said auxiliary frame aerial.

4. The combination of an aerial system including a pair of frame aerials fixed at an angle with respect to each other, and a vertical aerial, of a receiver, and a switching arrangement whereby the receiver may be connected to one of said frame aerials separately or to one of said frame aerials simultaneously with said vertical aerial and in which the connections between the last named frame aerial and receiver may be reversed to obtain the sense of direction.

ERNST HORNOFF.